United States Patent
Swasey

(10) Patent No.: US 9,739,318 B2
(45) Date of Patent: Aug. 22, 2017

(54) CLUTCH PISTON ASSEMBLY

(71) Applicant: Federal-Mogul Corporation, Southfield, MI (US)

(72) Inventor: Thomas W. Swasey, Okemos, MI (US)

(73) Assignee: Federal-Mogul LLC, Southfield, MI (US)

( * ) Notice: Subject to any disclaimer, the term of this patent is extended or adjusted under 35 U.S.C. 154(b) by 56 days.

(21) Appl. No.: 14/717,178

(22) Filed: May 20, 2015

(65) Prior Publication Data
US 2016/0341261 A1 Nov. 24, 2016

(51) Int. Cl.
| F16D 25/12 | (2006.01) |
| F16D 25/0638 | (2006.01) |
| B29K 71/00 | (2006.01) |
| B23P 15/00 | (2006.01) |
| F16D 25/08 | (2006.01) |
| B29C 45/14 | (2006.01) |

(52) U.S. Cl.
CPC ......... F16D 25/12 (2013.01); F16D 25/0638 (2013.01); B23P 15/00 (2013.01); B29C 45/14336 (2013.01); B29K 2071/00 (2013.01); F16D 25/083 (2013.01); F16D 2300/08 (2013.01)

(58) Field of Classification Search
CPC ....................................................... F16D 25/06
USPC ..................................................... 192/85.17
See application file for complete search history.

(56) References Cited

U.S. PATENT DOCUMENTS

| 4,271,951 A * | 6/1981 | Nishimura .............. F16D 25/06 |
| | | 192/106 F |
| 4,515,378 A | 5/1985 | Marshall |
| 4,521,027 A | 6/1985 | Marshall |
| 5,014,599 A | 5/1991 | Kocsis et al. |
| 5,363,744 A | 11/1994 | Pichler |
| 5,756,025 A | 5/1998 | Heine et al. |
| 5,795,518 A | 8/1998 | Parr |
| 5,874,170 A | 2/1999 | Heine et al. |
| 5,899,461 A | 5/1999 | Yomogita |
| 6,139,023 A | 10/2000 | Heine et al. |
| 6,511,075 B1 | 1/2003 | Schmidt |
| 6,705,447 B2 | 3/2004 | Gorman et al. |
| 7,021,447 B2 | 4/2006 | Duwel |
| 7,040,474 B2 | 5/2006 | Pedersen et al. |

(Continued)

FOREIGN PATENT DOCUMENTS

| DE | 19915022 A1 | 10/2000 |
| EP | 0284772 A2 | 10/1988 |

(Continued)

*Primary Examiner* — Jacob S Scott
*Assistant Examiner* — Timothy M Hannon
(74) *Attorney, Agent, or Firm* — Robert L. Stearns; Dickinson Wright, PLLC

(57) ABSTRACT

The clutch piston assembly includes a one piece piston body which extends about an axis and has at least one radially inwardly facing surface and at least one radially outwardly facing surface. At least one seal is engaged with the piston body and extends either radially outwardly from the radially outwardly facing surface or radially inwardly from the radially inwardly facing surface. The seal is made of polyetheretherketone (PEEK) or polyaryletherketone (PAEK) for establishing a low friction and fluid tight seal between the piston body and a wall in the automatic transmission.

15 Claims, 3 Drawing Sheets

(56) References Cited

U.S. PATENT DOCUMENTS

| | | |
|---|---|---|
| 7,267,044 B1 | 9/2007 | Klinger |
| 8,398,087 B2 | 3/2013 | Nishimura et al. |
| 8,425,823 B2 | 4/2013 | Duwel |
| 2004/0140626 A1 | 7/2004 | Hall et al. |
| 2004/0188948 A1 | 9/2004 | Lang |
| 2005/0096234 A1* | 5/2005 | Mack, Sr. ............... C08K 3/38 508/100 |
| 2006/0038352 A1 | 2/2006 | Gravier |
| 2006/0201772 A1* | 9/2006 | Kinpara ............... F16D 13/52 192/85.34 |
| 2007/0251380 A1 | 11/2007 | Kanzaki et al. |
| 2007/0278747 A1 | 12/2007 | Tajima |
| 2007/0295576 A1 | 12/2007 | Kiriki et al. |
| 2008/0234637 A1* | 9/2008 | McConnell ....... A61M 5/14216 604/249 |
| 2008/0276799 A1 | 11/2008 | Nishimura et al. |
| 2009/0038906 A1 | 2/2009 | Nishimura et al. |
| 2009/0140498 A1 | 6/2009 | Taguchi et al. |
| 2009/0235815 A1 | 9/2009 | Nishimura et al. |
| 2009/0282972 A1 | 11/2009 | Schmidt |
| 2010/0144955 A1* | 6/2010 | El-Hibri ................. C08G 75/23 524/514 |
| 2011/0098409 A1* | 4/2011 | Burch ................. C08K 3/0008 524/600 |
| 2011/0206880 A1* | 8/2011 | Wang ................. C08G 65/4037 428/36.9 |
| 2014/0060321 A1 | 3/2014 | Whitefield |

FOREIGN PATENT DOCUMENTS

| | | |
|---|---|---|
| EP | 0353462 A1 | 2/1990 |
| EP | 0482164 A1 | 4/1992 |
| EP | 0713990 A1 | 5/1996 |
| EP | 0780605 A1 | 6/1997 |
| EP | 1079155 A2 | 2/2001 |
| EP | 1146261 A2 | 10/2001 |

* cited by examiner

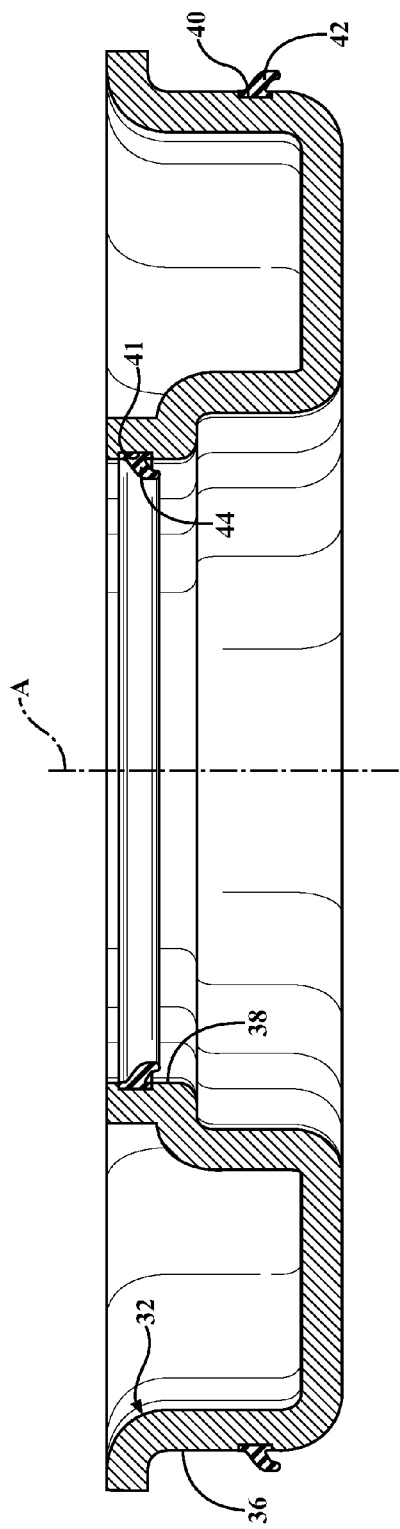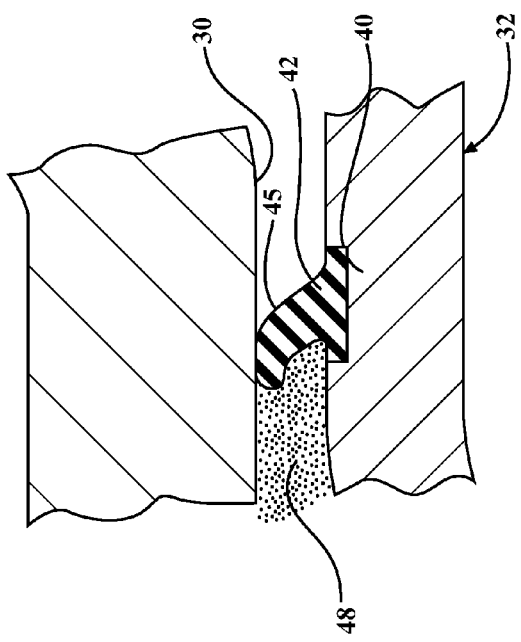

CLUTCH PISTON ASSEMBLY

BACKGROUND OF THE INVENTION

1. Field of the Invention

The present invention relates generally to clutch pistons for automatic transmissions of automobiles.

2. Related Art

Automatic transmissions in automobiles typically include one or more planetary gear sets which may be manipulated in various ways to produce a plurality of different gear ratios which may be selected for different operating conditions as programmed by a computer. The planetary gear sets are manipulated by selectively disengaging and engaging a plurality of clutch packs contained within an outer casing of the transmission. In general, each clutch pack is selectively engaged and disengaged by hydraulically actuating an associated clutch piston to energize the clutch piston against the clutch pack or withdraw the clutch piston from engagement with the clutch pack.

Typically, the clutch piston is formed of stamped steel or cast/machined aluminum with one or more rubber adjoining lips either retained within a groove or bonded directly. The rubber lip provides a fluid resistant seal between the piston assembly and the clutch housing creating a constrained cavity where fluid pressure will actuate the clutch piston in an axial direction inside the clutch housing. The rubber lip seals are typically made of a high modulus elastomer with a base polymer of FKM, AEM or ACM. The elastic nature of the rubber material allows for some distortion of the lip where the sealing contact patch is over a broader area then just the lip radius creating some resistance to movement.

SUMMARY OF THE INVENTION

One aspect of the invention provides for a clutch piston assembly for an automatic transmission of a vehicle. The clutch piston assembly includes at least one piston body component which extends about an axis and has at least one radial outwardly facing surface and may also have one radially inwardly facing surface. At least one sealing lip is attached with the piston body either retained inside a groove or bonded to the body surface. The sealing lip extends radially outwardly or inwardly. The seal is made of polyetheretherketone (PEEK) or polyaryletherketone (PAEK) for establishing a low friction and fluid tight seal between the piston body and the clutch housing wall in an automatic transmission.

The subject clutch piston sealing lip may be molded more quickly than traditional elastomer materials resulting in lower cost as cooling times are much lower. Specifically, the cycle time for injection molding PEEK or PAEK seals has been found to be significantly shorter than the cycle times for manufacturing rubber seals. Most importantly, PEEK or PAEK materials offer lower coefficients of friction giving the ability to reduce the frictional losses between the sealing lip and clutch housing wall resulting in better shifting feel and performance Another aspect of the present invention provides for a method of making a piston assembly for use in an automatic transmission. The method includes the step of making a piston body as a single piece of material and having at least one radially inwardly facing surface and at least one radially outwardly facing surface. The method continues with the step of engaging a seal of PEEK or PAEK with either the radially outwardly facing surface or the radially inwardly facing surface of the piston body for establishing a fluid tight seal between the piston body and a wall in the automatic transmission.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 2 is a cross-sectional view of the piston assembly of FIG. 1;

FIG. 3 is an enlarged view of the piston assembly with contact being shown between the piston assembly and a wall of the automatic transmission.

DESCRIPTION OF THE ENABLING EMBODIMENT

Figure 1:
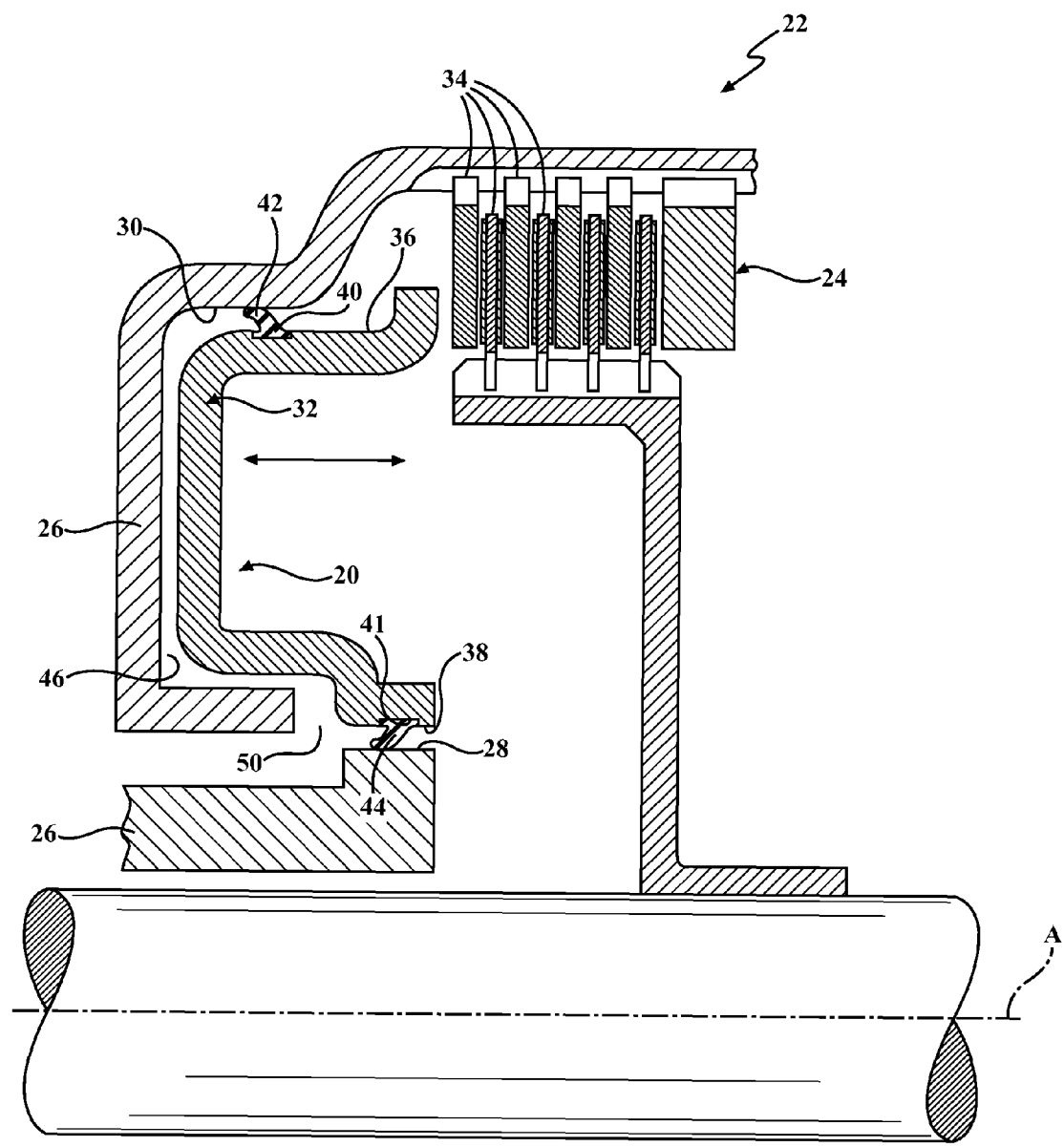
FIG. 1 is a cross-sectional and fragmentary view of an exemplary embodiment of a piston assembly installed in an automatic transmission assembly of a vehicle.

Referring to the Figures, wherein like numerals indicate corresponding parts throughout the several views, an exemplary embodiment of a hydraulically actuated clutch piston assembly 20 as installed in an automatic transmission 22 is generally shown in FIG. 1. As is common in the art, the automatic transmission 22 includes a planetary gear mechanism (not shown) and a clutch pack 24 for selectively adjusting the operation of the planetary gear mechanism to produce a desired gear ratio from an input to an output of the automatic transmission 22. Although only one is shown in FIG. 1, it should be appreciated that the automatic transmission 22 could include a plurality of such clutch piston assembly 20 and clutch pack 24 combinations for allowing the automatic transmission 22 to produce many different gear ratios. The automatic transmission 22 further includes a clutch housing 26 with an inner outer wall 30 and in some instances an inner wall 28 that form a confined cavity, and the piston body 32 is moveable in an axial direction within the cavity. The piston body 32 is engageable with the clutch pack 24 to selectively establish contact between or separate a plurality of clutch plates 34 within the clutch pack 24 from one another, thereby activating the clutch pack 24. Herein the clutch housing will be referred to as housing 26.

Referring now to FIG. 2, the exemplary embodiment of the piston assembly 20 includes a piston body 32 which is made as one or more components of material, such as aluminum or plastic. The piston body 32 is generally annular in shape when viewed from above and is generally symmetrical in shape around an axis A. The piston body 32 further has a radially outwardly facing surface 36 and a radially inwardly facing surface 38, each of which extends continuously around the axis A. Each of the radially outwardly and radially inwardly facing surfaces 36, 38 also may present a groove 40, 41 with each groove 40, 41 extending circumferentially around the axis A. Specifically, the radially outwardly facing surface 36 is provided with a first groove 40, and the radially inwardly facing surface 38 is provided with a second groove 41. It should be appreciated that the piston body 32 may take a wide range of shapes depending upon space constraints within the automatic transmission 22.

The piston body 32 may also be made through any suitable process, e.g., casting, injection molding, stamping, turning, etc.

Referring back to FIG. 1, the piston assembly 20 includes a pair of lip seals 42, 44 which are partially disposed in the grooves 40 and extend radially therefrom to establish fluid-tight seals between the piston body 32 and the walls 28, 30 of the housing 26. Specifically, the piston assembly 20 includes a first seal 42 which is received within the first groove 40 on the radially outwardly facing surface 36 of the piston body 32 and a second seal 44 which is received within the second groove 41 on the radially inwardly facing surface 38 of the piston body 32. When the clutch piston assembly 20 is installed in the automatic transmission 22, the seals 42, 44, piston body 32 and housing 26 together define an expandable cavity 46 with an annular shape. Each of the exemplary seals 42, 44 is provided with a lip 45 (best shown in FIG. 3) which extends both radially and also axially in the direction of the expandable cavity 46 for improving the fluid tight seals established with the housing 26.

The expandable cavity 46 is in communication with a hydraulic fluid 48 port 50 within the automatic transmission 22. During operation, a hydraulic fluid 48 (shown in FIG. 3) is pumped into the expandable cavity 46. Because the seals 42, 44 are in a fluid tight engagement with the walls 28, 30 and the fact that hydraulic fluid 48 is, for all practical purposes uncompressible, pumping the hydraulic fluid 48 into the expandable cavity 46 has the effect of urging the piston body 32 in a first axial direction to contact and activate the clutch pack 24 as discussed above. Although not shown, the piston body 32 may be biased towards the resting position shown in FIG. 1 by, for example, a spring.

Each of the seals 42, 44 is made as one integral piece of polyetheretherketone (PEEK) or polyaryletherketone (PAEK). These materials have a relatively high modulus. The high modulus materials allows for the sealing lips 45 to be designed with less contact area and coupled with the lower coefficient of friction properties, which allows for very low parasitic losses compared to traditional seals made of elastomer materials where the sealing lip contacts one or both of the associated walls 28, 30 of the clutch housing 26. As such, the PEEK or PAEK seals 42, 44 offer improved performance and durability as compared to other known seals by reducing the friction between the seal 42, 44 and the housing 26. Additionally, the PEEK or PAEK seals 42, 44 may also be manufactured more quickly and cost effectively than other known seals because the cycle times for injection molding PEEK and PAEK are significantly lower than the cycle times for injection molding parts of rubber or synthetic rubber materials.

Preferably, the PEEK or PAEK seals 42, 44 are injection molded directly onto the piston body 32, i.e., the seals 42, 44 are overmolded onto the piston body 32. This provides for very strong and durable connections between the seals 42, 44 and the piston body 32 and may be carried out at a low cost.

The PEEK or PAEK seals 42, 44 may be also be bonded to the piston body 32 to further improve the connections therebetween. One such bonding connection could be provided by subjecting the outer surface of the piston body 32 at the groove 40 to an air plasma discharge process before overmolding the PEEK or PAEK seal onto the piston body 32. Adhesive may need to be applied after the plasma treatment.

Another aspect of the present invention is a method of making a clutch piston assembly 20. The method includes the step of making a piston body 32 of a single piece of plastic or aluminum. The piston body 32 may be made through, for example, injection molding or casting operations. As formed, the piston body 32 includes a radially outwardly facing surface 36 and a radially inwardly facing surface 38. A first groove 40 is formed in the radially outwardly facing surface 36, and a second groove 40 is formed in the radially inwardly facing surface 38.

Figure 4:
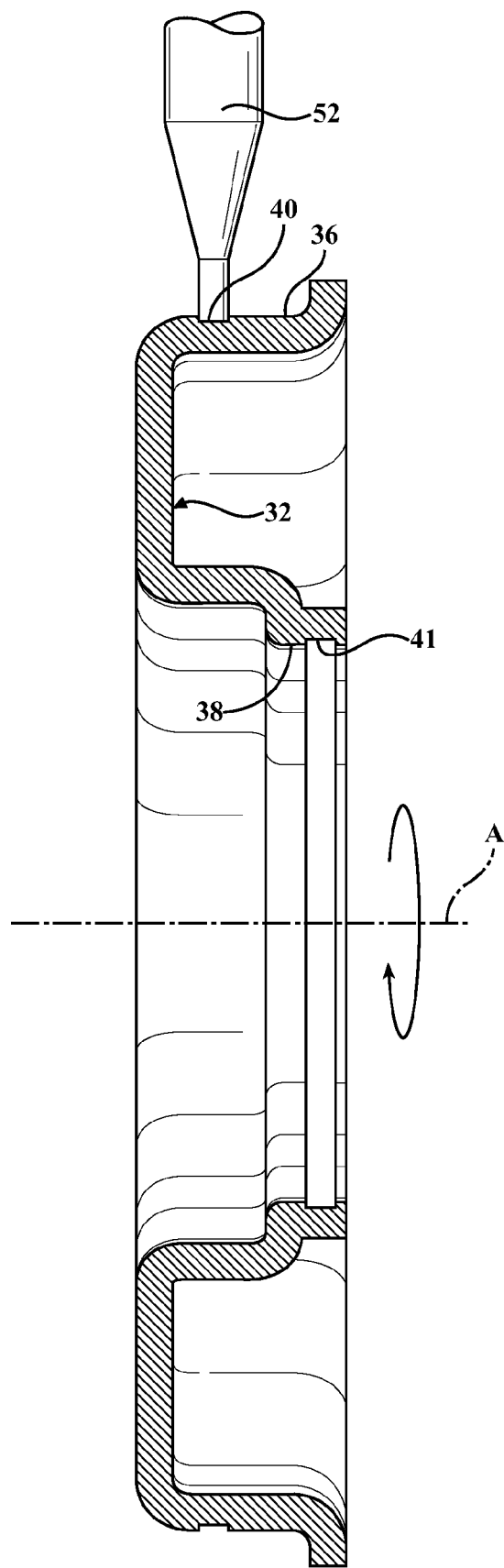
FIG. 4 is a cross-sectional view of as piston body during an air plasma treatment process.

Referring now to FIG. 4, the method may continue with the step of surface treating the grooves 40 on the radially inwardly facing surface 38 and the radially outwardly facing surface 36 of the piston body 32 with an air plasma treatment process using an air plasma emitter 52. In operation, the air plasma emitter 52 blows atmospheric gas past two high voltage electrodes (not shown) which positively charge the air before it is blown onto the piston body 32. The method then continues with the steps of injection molding a first seal 42 of PEEK or PAEK directly onto the groove 40 of on the radially outwardly facing surface 36 of the piston body 32 and injection molding a second seal 44 directly onto the groove 40 of the radially inwardly facing surface 38 of the piston body 32. The plasma treatment process has been found to improve the bond established between the housing and the PEEK or PAEK seal 42, 44 following the overmolding process.

Obviously, many modifications and variations of the present invention are possible in light of the above teachings and may be practiced otherwise than as specifically described while within the scope of the appended claims.

What is claimed is:

1. A clutch piston assembly for an automatic transmission of an automobile, comprising:

a housing;

an at least one piece piston body which extends about an axis and has at least one of a radially inwardly facing surface and a radially outwardly facing surface;

at least one seal engaged with said piston body and extending either radially outwardly from said radially outwardly facing surface or radially inwardly from said radially inwardly facing surface and sealed against a wall of said housing to define an expandable cavity on one axial side of said one piece piston body; and said seal being made of polyetheretherketone (PEEK) or polyaryletherketone (PAEK) and being molded to present a flat base which extends parallel to said axis and to present a curved lip which extends radially from said flat base and curves axially when in a resting condition; and wherein said curved lip is curved axially towards said expandable cavity to present an annular pocket between said lip and said piston body.

2. The clutch piston assembly as set forth in claim 1 wherein said at least one seal is made of PEEK.

3. The clutch piston assembly as set forth in claim 1 wherein said at least one seal is made of PAEK.

4. The clutch piston assembly as set forth in claim 1 wherein said piston body is made of plastic or aluminum.

5. The clutch piston assembly as set forth in claim 1 wherein said at least one seal is further defined as a pair of seals with one of said seals extending radially outwardly from said at least one radially outwardly facing surface and one of said seals extending radially inwardly from said at least one radially inwardly facing surface.

6. The clutch piston as set forth in claim 1 wherein said at least one radially outwardly surface or said at least one radially inwardly facing surface includes a groove, within which said at least one seal is at least partially disposed.

7. The clutch piston assembly as set forth in claim 1 wherein said at least one seal is in an overmolding engagement with said clutch piston.

8. The clutch piston assembly as set forth in claim 1 wherein said piston body has a flange with a pressing surface which is perpendicular to said axis.

9. A method of making a piston assembly for an automatic transmission, comprising the steps of:
preparing a housing with a wall;
making a piston body at least one piece of material and having at least one of a radially inwardly facing surface and a radially outwardly facing surface; and
injection molding a seal of a polyetheretherketone (PEEK) or polyaryletherketone (PAEK) that has, when in a resting condition, a flat base which extends parallel to an axis and has a curved lip which extends radially from the flat base and is curved in one axial direction;
engaging the seal with either the radially inwardly facing surface or the radially outwardly facing surface of the piston body and such that the curved lip is spaced from the piston body by pocket that has an annular shape; and
inserting the piston body with the seal into the housing such that the curved lip of the seal contacts the wall of the housing to define an expandable cavity on one axial side of the piston body and wherein the curved lip curves axially towards the expandable cavity.

10. The method as set forth in claim 9 wherein said step of engaging the seal of PEEK or PAEK with the piston body is further defined as overmolding the seal directly into engagement either the radially outwardly facing surface or the radially inwardly facing surface of the piston body.

11. The method as set forth in claim 10 wherein said step of overmolding the seal with the piston body is further defined as overmolding a first seal with the radially inwardly facing surface of the piston body and further including the step of overmolding a second seal with the radially outwardly facing surface of the piston body.

12. The method as set forth in claim 9 wherein the piston body is made of aluminum or plastic.

13. The method as set forth in claim 9 wherein the piston body has a first groove in the radially outwardly facing surface and a second groove in the radially inwardly facing surface.

14. The method as set forth in claim 9 further including the step of air plasma treating at least one of the radially outwardly facing surface and the radially inwardly facing surface before the step of engaging the seal with the radially outwardly facing surface or the radially inwardly facing surface.

15. The clutch piston assembly as set forth in claim 9 wherein the piston body has a flange with a pressing surface which is perpendicular to said axis.

\* \* \* \* \*